US012095188B2

(12) United States Patent
Liao et al.

(10) Patent No.: US 12,095,188 B2
(45) Date of Patent: Sep. 17, 2024

(54) ELECTRICAL CONNECTOR WITH A REINFORCED TONGUE

(71) Applicant: T-CONN PRECISION CORPORATION, New Taipei (TW)

(72) Inventors: Chien-An Liao, New Taipei (TW); Chien-Chun Lu, New Taipei (TW); Jen-Hao Chang, New Taipei (TW)

(73) Assignee: T-CONN PRECISION CORPORATION, New Taipei (TW)

( * ) Notice: Subject to any disclaimer, the term of this patent is extended or adjusted under 35 U.S.C. 154(b) by 381 days.

(21) Appl. No.: 17/734,191

(22) Filed: May 2, 2022

(65) Prior Publication Data

US 2023/0307857 A1 Sep. 28, 2023

(30) Foreign Application Priority Data

Mar. 24, 2022 (TW) .................................. 111111064

(51) Int. Cl.
*H01R 12/72* (2011.01)
*H01R 13/502* (2006.01)
*H01R 24/60* (2011.01)

(52) U.S. Cl.
CPC ......... *H01R 12/724* (2013.01); *H01R 13/502* (2013.01); *H01R 24/60* (2013.01)

(58) Field of Classification Search
CPC H01R 13/6585; H01R 13/502; H01R 12/724; H01R 24/60
USPC ............................................. 439/331, 607.05
See application file for complete search history.

(56) References Cited

U.S. PATENT DOCUMENTS

| | | | |
|---|---|---|---|
| 10,333,257 B2 | 6/2019 | Tseng | |
| 2017/0021419 A1 | 1/2017 | Ng et al. | |
| 2017/0070013 A1* | 3/2017 | Hsu | H01R 13/6585 |
| 2018/0191103 A1* | 7/2018 | Zhao | H01R 24/60 |
| 2019/0067860 A1* | 2/2019 | Zhao | B29C 45/00 |
| 2019/0089077 A1* | 3/2019 | Huang | H01R 12/716 |
| 2019/0131748 A1* | 5/2019 | Cheng | H01R 13/6597 |
| 2019/0173235 A1* | 6/2019 | Feng | H01R 13/6594 |

FOREIGN PATENT DOCUMENTS

| | | |
|---|---|---|
| CN | 204067678 U | 12/2014 |
| CN | 106684610 A | 5/2017 |
| CN | 206834371 U | 1/2018 |
| CN | 107732529 A | 2/2018 |

(Continued)

*Primary Examiner* — Gary F Paumen
(74) *Attorney, Agent, or Firm* — Best & Flanagan LLP

(57) ABSTRACT

An electrical connector with a reinforced tongue has a package, an upper terminal set, a lower terminal set, and a median septum. The package is provided with a tongue. The upper terminal set is mounted in the package and includes multiple upper terminals. The lower terminal set is mounted in the package and includes multiple lower terminals. A median septum is mounted in the package and the tongue, is disposed between the upper terminal set and the lower terminal set, and has a protective wall formed onto two side edges and a front edge of the median septum and longitudinally extends, so as to form two tongue sides and a tongue tip of the tongue. A structural strength of the tongue can be greatly improved, so as to prevent the tongue from being damaged when the electrical connector is plugged or unplugged with improper angle or unsuitable force.

18 Claims, 10 Drawing Sheets

(56) References Cited

FOREIGN PATENT DOCUMENTS

| | | | |
|---|---|---|---|
| CN | 208062342 | U | 11/2018 |
| CN | 214898980 | U | 11/2021 |
| TW | M519829 | U | 4/2016 |
| TW | M537729 | U | 3/2017 |
| TW | 201906253 | A | 2/2019 |
| TW | M604068 | U | 11/2020 |
| TW | M618701 | U | 10/2021 |
| TW | I754874 | B | 2/2022 |

* cited by examiner

ELECTRICAL CONNECTOR WITH A REINFORCED TONGUE

BACKGROUND OF THE INVENTION

1. Field of the Invention

The present invention relates to an electrical connector, especially to an electrical connector with a reinforced tongue, so as to prevent the electrical connector from being damaged while plugging or unplugging.

2. Description of the Prior Art(s)

With reference to FIG. 8, a conventional electrical connector of USB Type-C is shown and comprises a metal mask 70 and a package 80 enclosed by the metal mask 70. With further reference to FIGS. 9 and 10, a tongue 81 protrudes from a front end surface of the package 80 in a horizontal direction. Multiple upper terminals 91 are separately arranged and embedded in the package 80 and the tongue 81, and are partially exposed on an upper surface of the tongue 81 for electrical contact. Multiple lower terminals 92 are separately arranged and embedded in the package 80 and the tongue 81, and are partially exposed on a lower surface of the tongue 81 for electrical contact.

With further reference to FIG. 10, a median septum 60 is also embedded in the package 80 and the tongue 81 and is disposed between the upper terminals 91 and the lower terminals 92. The median septum is formed as a plate and has a wide section 61, a narrow section 62, and two lateral wings 63. The narrow section 62 is disposed in the tongue 81 and has two opposite side edges. The two lateral wings 60 protrudes from the two side edges of the narrow section 62 respectively. Each of the lateral wings 62 protrudes from a corresponding one of the side edges of the narrow section 62 at a position that is adjacent to the wide section 61, extends along the corresponding one of the side edges of the narrow section 62, and is partially exposed outside the tongue 81, such that the two lateral wings 62 protect two opposite sides of the tongue 81 from being damaged.

According to the specification of a USB Type-C connector, the USB Type-C connector should be durable in 10,000 plug-unplug cycles and pass a 4-axis continuity test that constantly bends and warps an interface of the USB Type-C connector. However, the interface of the USB Type-C connector is only 8.3 millimeters (mm) in width and 2.5 mm in thickness, and the tongue 81, on which stress is concentrated during being bent and warped, is only 0.7 mm in thickness.

In addition to separate the upper terminals 91 and the lower terminals 92, the median septum 60 also reinforces structures on both of the sides of the tongue 81 with the two lateral wings, 62. However, the median septum 60 in the conventional electrical connector of USB Type-C is made by stamping a metal sheet, and each of the lateral wings 63 for reinforcing and protection is connected to the narrow section 62 of the median septum 60 only with an end and is disposed beside the narrow section 62 of the median septum 60 after being bent. The lateral wings 63 have quite limited effect on improving wear resistance of the two sides of the tongue 81. Consequently, the tongue 81 is easily damaged after frequent plugging and unplugging, which in turn affects normal operation of the conventional electrical connector.

Furthermore, the tongue 81 of the conventional electrical of USB Type-C is extremely thin. Therefore, the tongue 81 would be damaged when plugging in improper angle or with improper force, which also affects the normal operation of the conventional electrical connector.

To overcome the shortcomings, the present invention provides an electrical connector with a reinforced tongue to mitigate or obviate the aforementioned problems.

SUMMARY OF THE INVENTION

The main objective of the present invention is to provide an electrical connector with a reinforced tongue. The electrical connector has a package, an upper terminal set, a lower terminal set, and a median septum. The package is provided with a tongue, and the tongue protrudes from a front end surface of the package. The upper terminal set is mounted in the package and includes multiple upper terminals. An end of each of the upper terminals is partially exposed on an upper surface of the tongue. The lower terminal set is mounted in the package and includes multiple lower terminals. An end of each of the lower terminals is partially exposed on a lower surface of the tongue. A median septum is mounted in the package and the tongue and is disposed between the upper terminal set and the lower terminal set. The median septum has a front edge, two side edges, and a protective wall. The protective wall is formed onto the two side edges of the median septum and the front edge of the median septum and longitudinally extends up from an upper surface of the median septum and down from a lower surface of the median septum, so as to form two tongue sides and a tongue tip of the tongue.

In the present invention, the protective wall, which is formed onto the two side edges and the front edge of the median septum and longitudinally extends, is different from a conventional median septum, which has lateral wings that are made by bending metal sheet. By forming the protective wall, which is thick and extends continuously, on the two side edges and the front edge of the median septum to form the two tongue sides and the tongue tip of the tongue, a structural strength of the tongue can be greatly improved multi-directionally. In addition to significantly improve wear resistance of the tongue, even though a plugging angle may be deviated or an excessive force may be applied when plugging the electrical connector, the tongue tip of the tongue is not damaged due to its high structural strength, keeping the electrical connector of the present invention operating normally.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
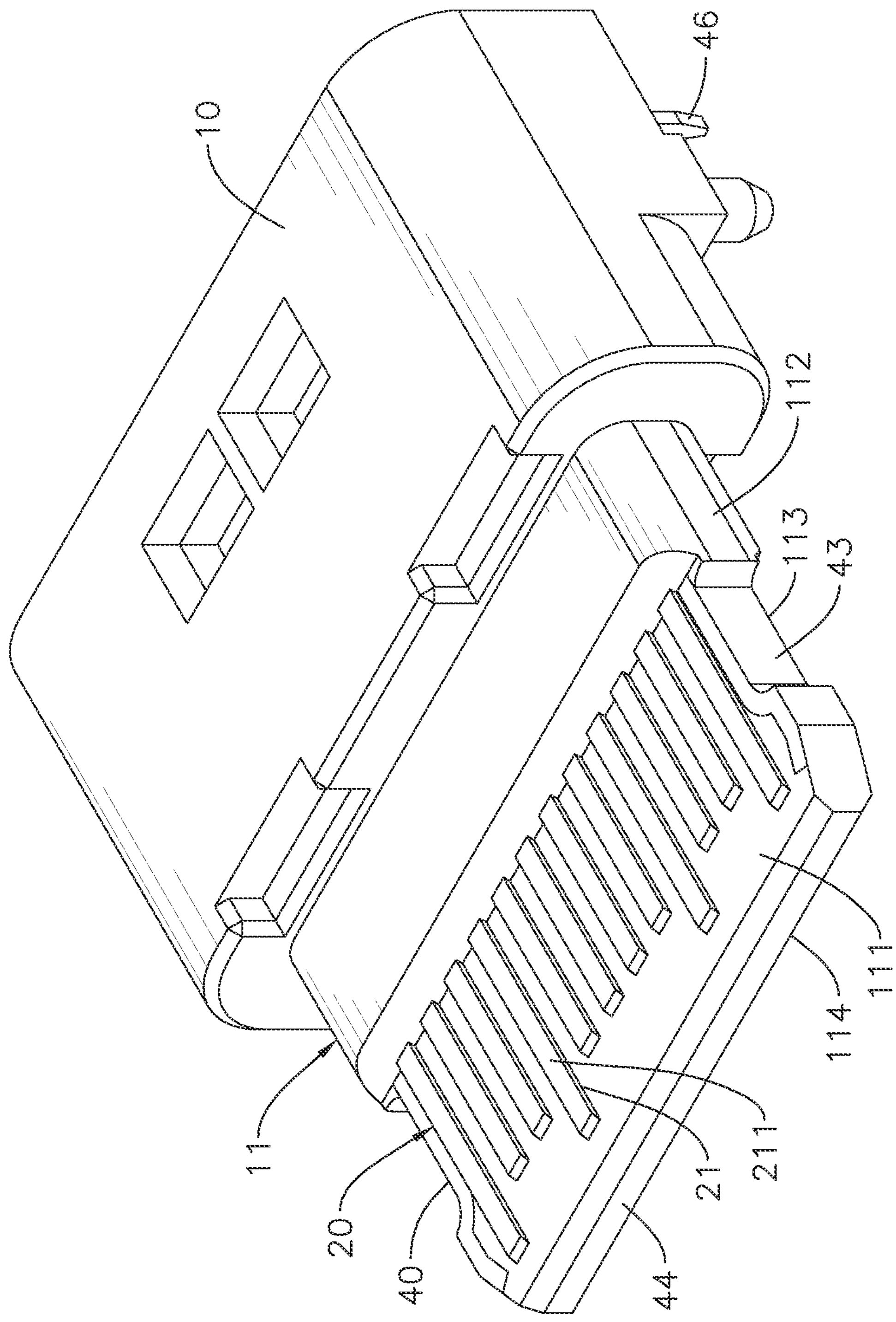
FIG. 1 is a perspective view of an electrical connector with a reinforced tongue in accordance with the present invention.
Figure 2:
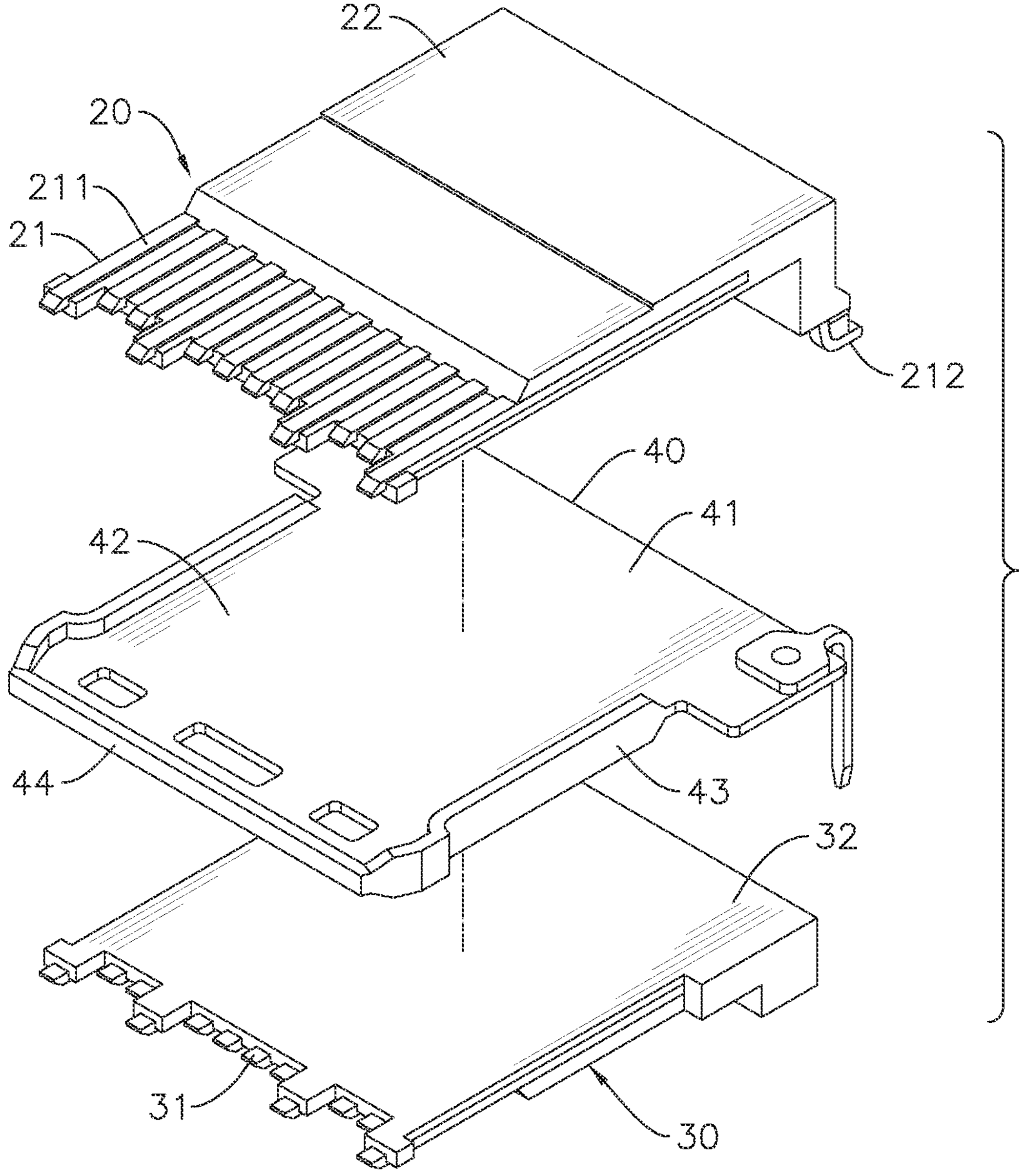
FIG. 2 is an exploded perspective view of the electrical connector in FIG. 1, showing a package being omitted.

With reference to FIGS. 1 and 2, a preferred embodiment of an electrical connector with a reinforced tongue in accordance with the present invention is shown and comprises a package 10, an upper terminal set 20, a lower terminal set 30, and a median septum 40. It should be stated in advance that all people skilled in the art understand that the electrical connector also includes a metal mask for enclosing the package 10. The metal mask is not disclosed hereinafter because the metal mask is not directly related to the technical features of the present invention.

The package 10 is made of plastic, is substantially rectangular cuboid, and is provided with a tongue 11 protruding from a central portion of a front end surface of the package 10 in a horizontal direction. The tongue 11 has a distal portion 111 and a proximal portion 112. A thickness of the distal portion 111 of the tongue 11 is less than a thickness of the proximal portion 112 of the tongue 11.

Figure 3:
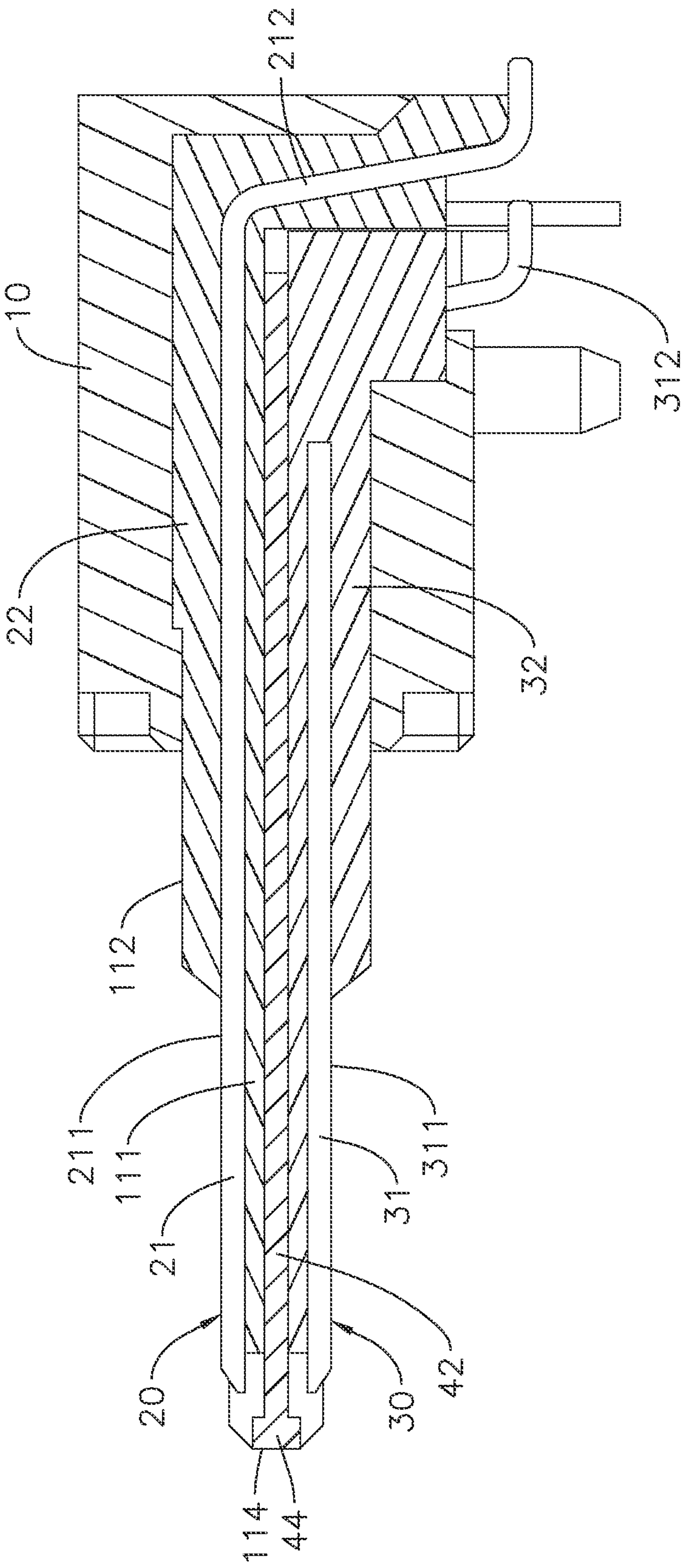
FIG. 3 is a cross-sectional side view of the electrical connector in FIG. 2.

With further reference to FIGS. 2 and 3, the upper terminal set 20 is mounted in the package 10 and includes multiple upper terminals 21. An end of each of the upper terminals 21 is partially exposed on an upper surface of the tongue 11 for electrical contact. Specifically, each of the upper terminals 21 has a horizontal segment 211 and a bent segment 212. The horizontal segment 211 of the upper terminal 21 is disposed in the distal portion of the tongue 11 and is partially exposed on the upper surface of the tongue 11 for electrical contact. The bent segment 212 of the upper terminal 21 is partially exposed outside the package 10 and is formed as a pin. In the preferred embodiment, for easy assembly, the upper terminal set 20 further includes an upper block 22. The upper terminals 21 are embedded on the upper block 22 in advance, and then the upper terminals 21 and the upper block 22 are covered by the package 10.

The lower terminal set 30 is mounted in the package 10 and includes multiple lower terminals 31. An end of each of the lower terminals 31 is partially exposed on a lower surface of the tongue 11 for electrical contact. Specifically, each of the lower terminals 31 has a horizontal segment 311 and a bent segment 312. The horizontal segment 311 of the lower terminal 31 is disposed in the proximal portion of the tongue 11 and is partially exposed on the lower surface of the tongue 11 for electrical contact. The bent segment 312 of the lower terminal 31 is partially exposed outside the package 10 and is formed as a pin. In the preferred embodiment, for easy assembly, the lower terminal set 30 further includes a lower block 32. The lower terminals 31 are embedded on the lower block 32 in advance, and then the lower terminals 31 and the lower block 32 are covered by the package 10.

Figure 4:
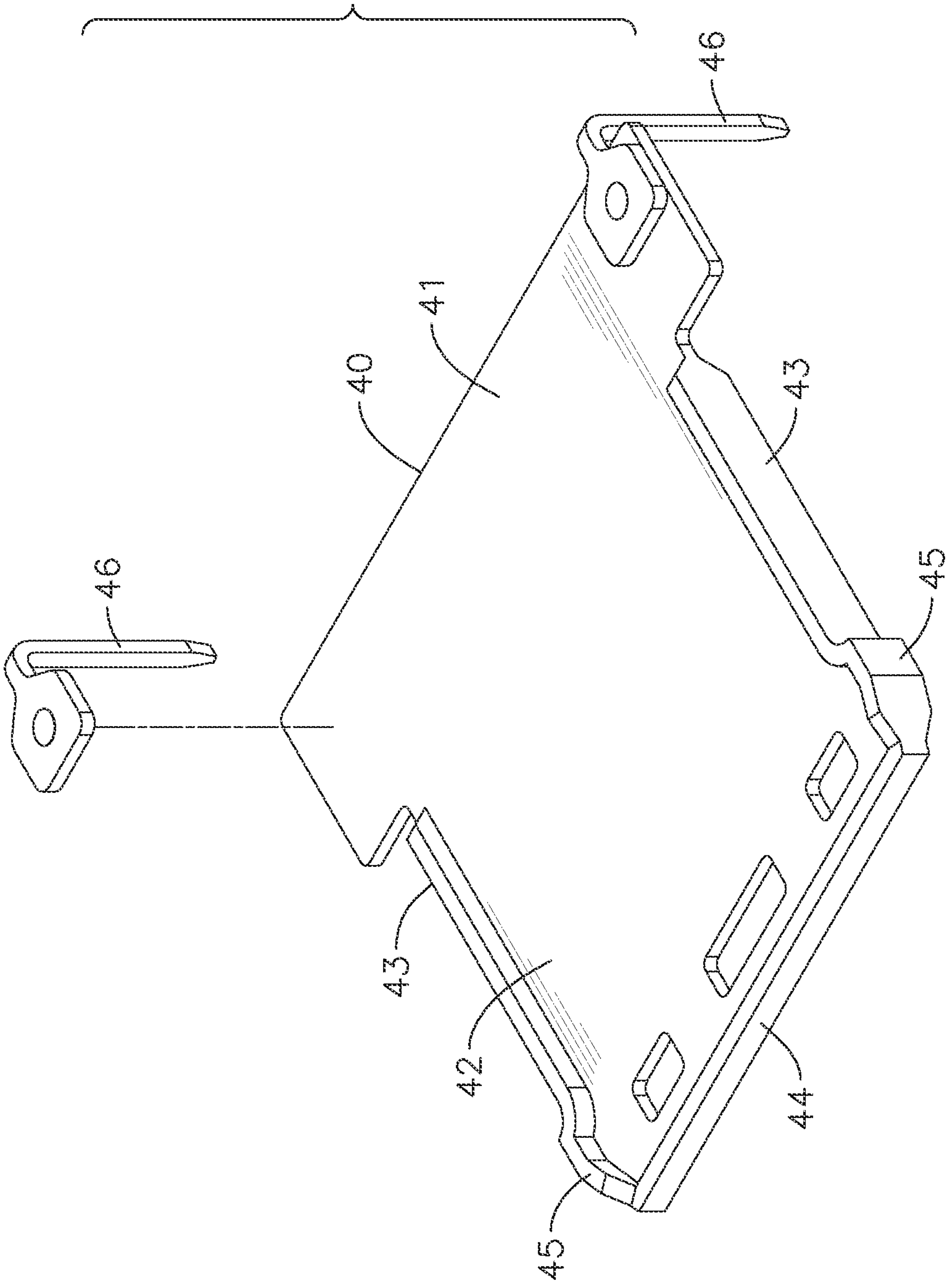
FIG. 4 is a partially exploded perspective view of a median septum of the electrical connector in FIG. 1.

As shown in FIGS. 2 and 3, the median septum 40 is mounted in the package 10 and the tongue 11 and is disposed between the upper terminal set 20 and the lower terminal set 30 along a vertical direction. With further reference to FIG. 4, the median septum 40 is substantially formed as a plate and has a front edge, two side edges and a protective wall. The protective wall is formed onto the two side edges of the median septum 40 and the front edge of the median septum 40 and longitudinally extends up from an upper surface of the median septum 40 and down from a lower surface of the median septum 40, so as to form two tongue sides 113 and a tongue tip 114 of the tongue 11.

Figure 5:
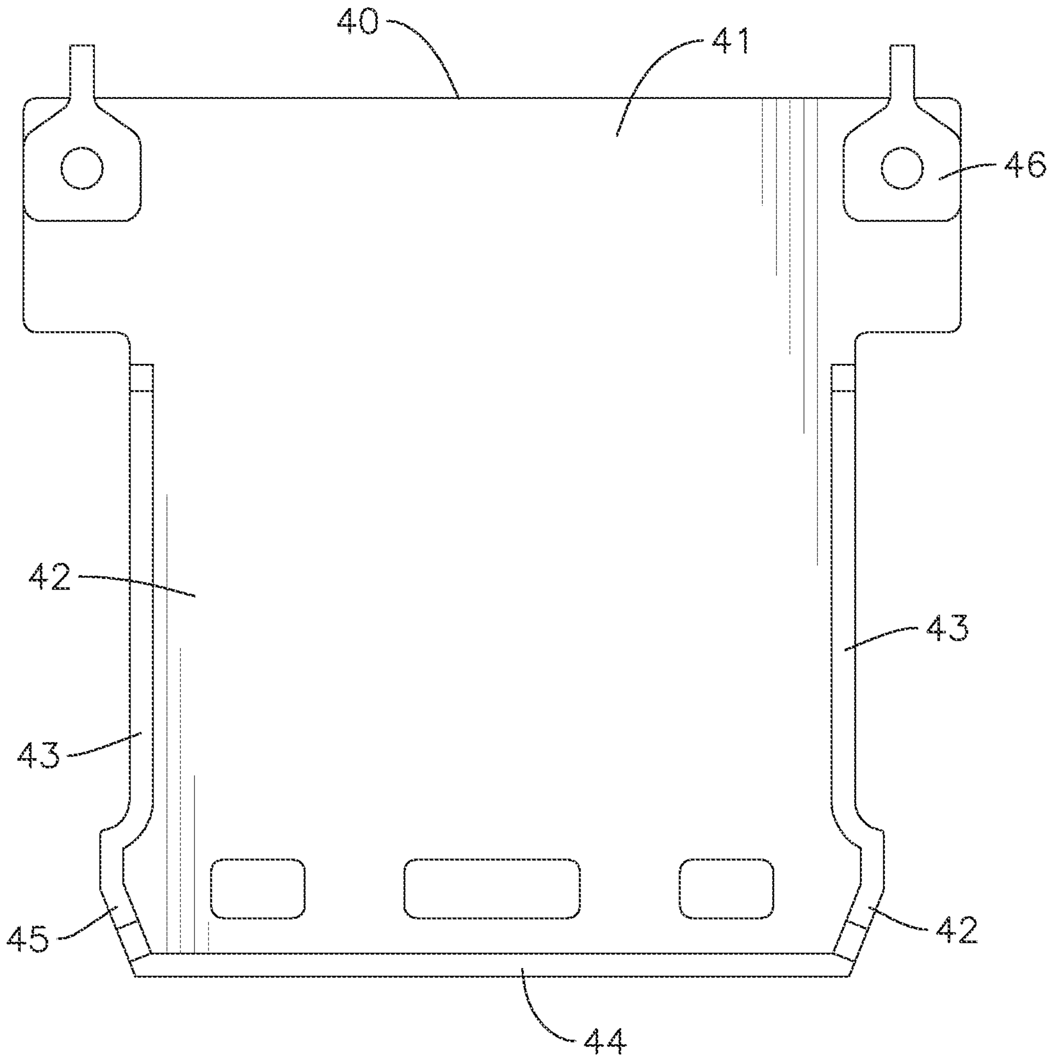
FIG. 5 is a top view of the median septum of the electrical connector in FIG. 4.

With further reference to FIGS. 4 and 5, the median septum 40 has a wide section 41 and a narrow section 42 and is T-shaped when viewed from top. The narrow section 42 is disposed in the tongue 11. The protective wall includes two side sub-walls 43 and a front sub-wall 44. The two side sub-walls 43 are formed onto the two side edges of the median septum 40 respectively and longitudinally extend up from the upper surface of the median septum 40 and down from the lower surface of the median septum 40 such that the median septum 40 and each of the side sub-walls 43 is T-shaped in cross-section. Moreover, an outer side surface of each of the side sub-walls 43 is exposed outside the distal portion 111 of the tongue 11 to form one of the tongue sides 113.

The front sub-wall 44 is formed onto the front edge of the median septum 40 and longitudinally extends up from the upper surface of the median septum 40 and down from the lower surface of the median septum 40 such that the median septum 40 and the front sub-wall 44 is T-shaped in cross-section. Moreover, a front surface of the front sub-wall 44 is exposed outside the distal portion 111 of the tongue 11 to form the tongue tip 114. A height of each of the side sub-wall 43 is greater than a height of the front sub-wall 44.

In order to further improve the structural strength of the side sub-walls 43 and the front sub-wall 44, two opposite ends of the front sub-wall 44 are connected with the side sub-walls 43 through two connecting sub-walls 45 respectively. The connecting sub-walls 45 are also formed onto the side edges of the median septum 40 respectively. Accordingly, the two side sub-walls 43, the two connecting sub-walls 45 and the front sub-wall 44 form the protective wall that continuously extending from one of the side edges of the median septum 40, through the front edge of the median septum 40 and then to the other side edge of the median septum 40, such that the structural strength of the side sub-walls 43 and the front sub-wall 44 is improved.

Each of the connecting sub-walls 45 longitudinally extends up from the upper surface of the median septum 40 and down from the lower surface of the median septum 40 and has a rear end and a front end. The rear end of the connecting sub-wall 45 is connected with a corresponding one of the side sub-walls 43 and has a height that is the same as the height of the corresponding side sub-wall 43. The front end of the connecting sub-wall 45 is connected with the front sub-wall 44 and has a height that is the same as the height of the front sub-wall 44. That is, the height of the connecting sub-wall 45 decreases from the rear end to the front end in height.

In the present invention as described, the two side sub-walls 43 and the front sub-wall 44 on the two side edges and the front edge of the narrow section 42 of the median septum 40 form the tongue sides 113 and the tongue tip 114 of the tongue 11. The median septum 40 and the side sub-walls 43 and the front sub-wall 44 on the median septum 40 are able to have increased thicknesses and improved structural strength. Therefore, unlike a median septum, which is made by stamping and bending a metal sheet, of the conventional electrical connector, the median septum 40 of the present invention may be made by die casting or metal injection modeling (MIM).

As shown in FIG. 4, the median septum 40 further has two connection pins 46 mounted on two opposite ends of the wide section 41 and forming electrical connections. With further reference, an end of each of the connection pins 46 protrudes out of the package 10 and is configured as a ground pin.

Figure 6:
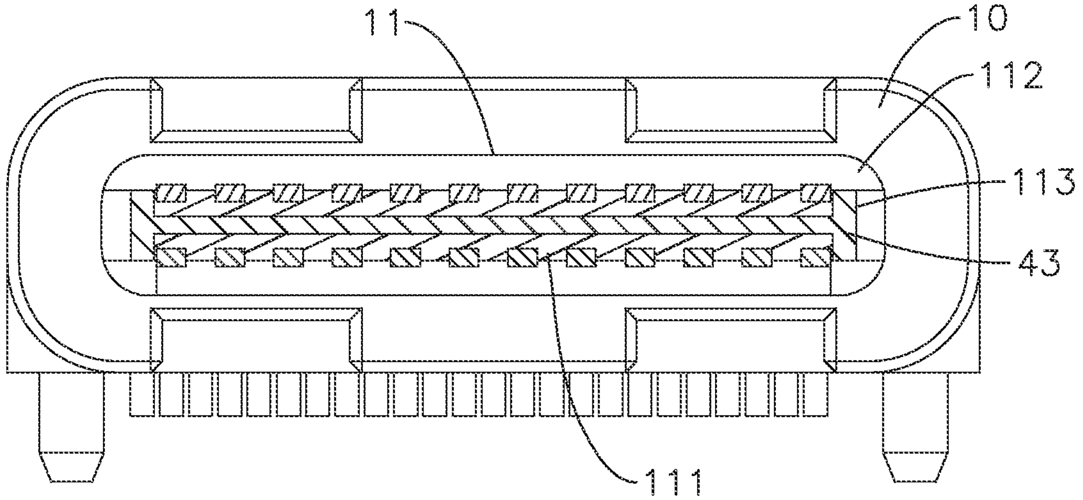
FIG. 6 is a cross-sectional front view of the electrical connector in FIG. 1.
Figure 7:
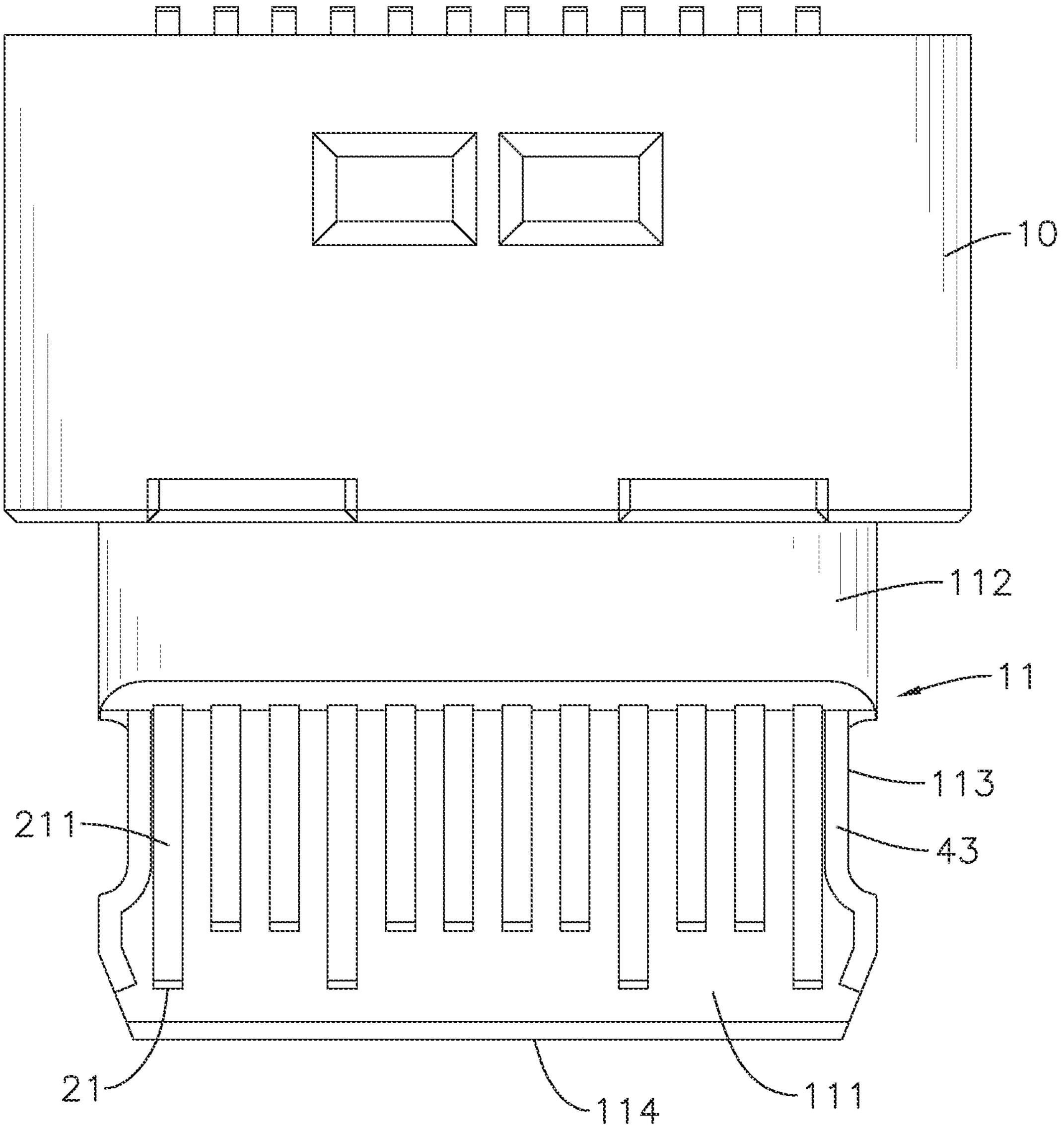
FIG. 7 is a top view of the electrical connector in FIG. 1.
Figure 8:
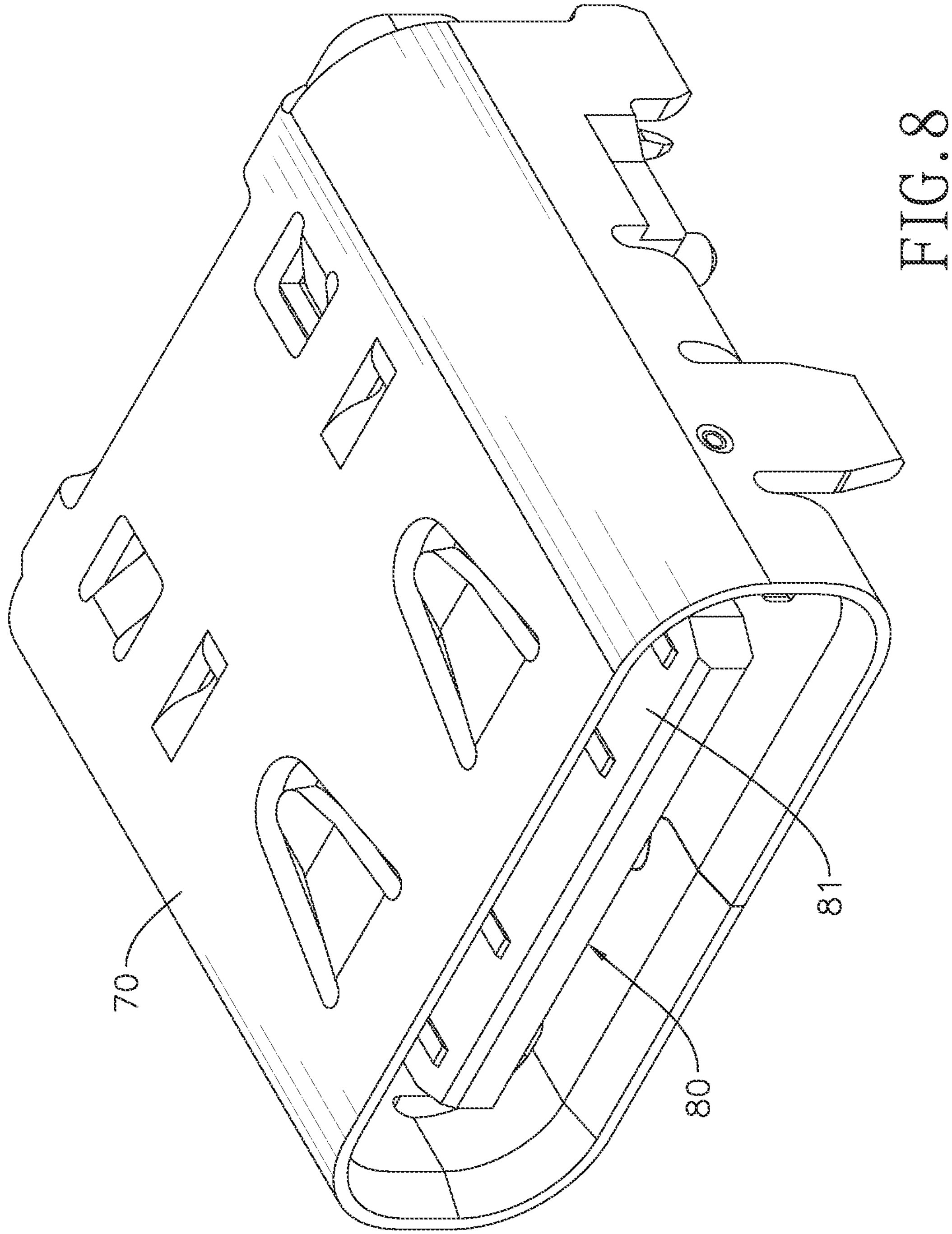
FIG. 8 PRIOR ART
FIG. 8 is a perspective view of a conventional electrical connector in accordance with the prior art.
Figure 9:
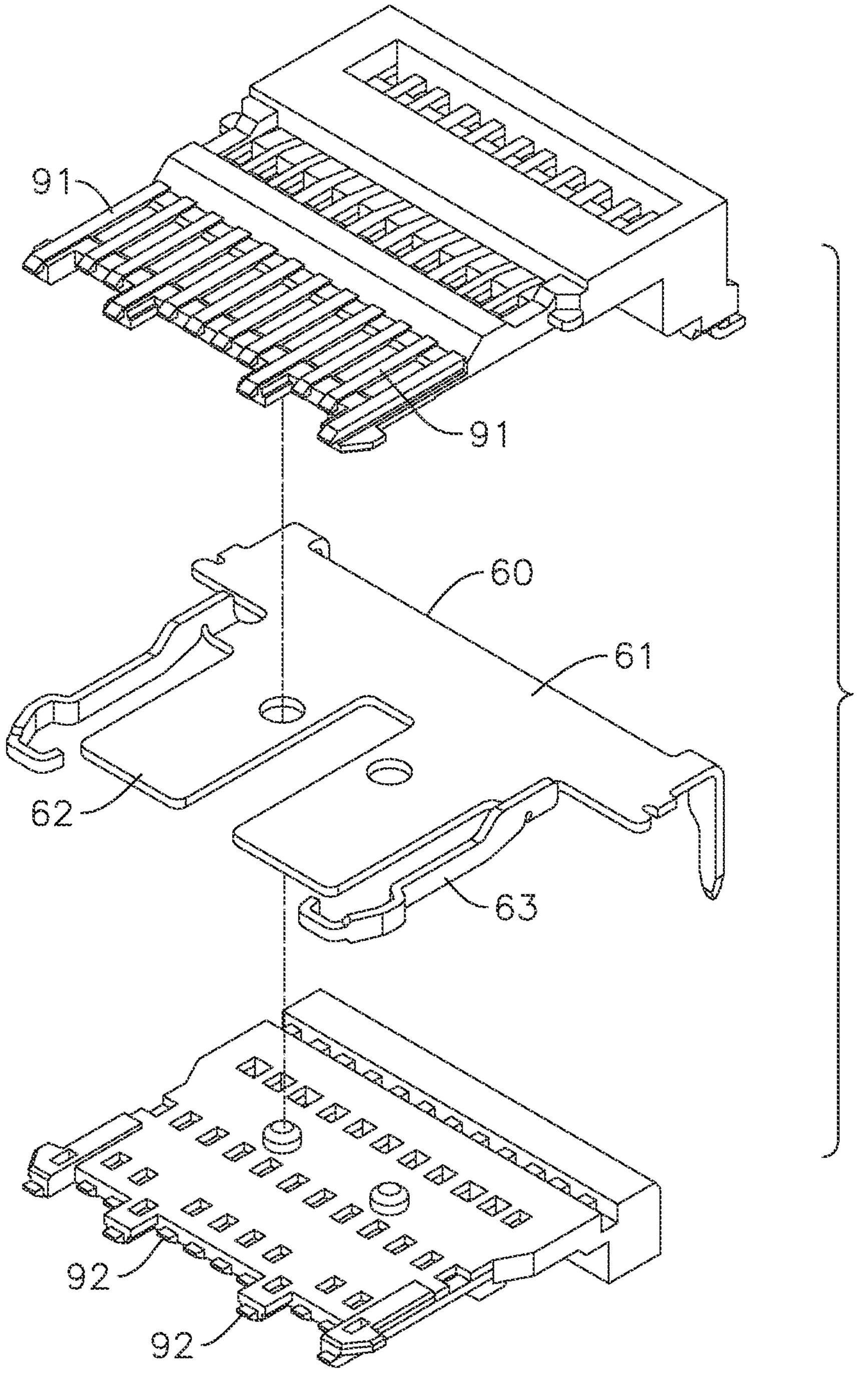
FIG.9 PRIOR ART
FIG. 9 is an exploded perspective view of the conventional electrical connector in FIG. 8, showing a metal mask and a package being omitted.
Figure 10:
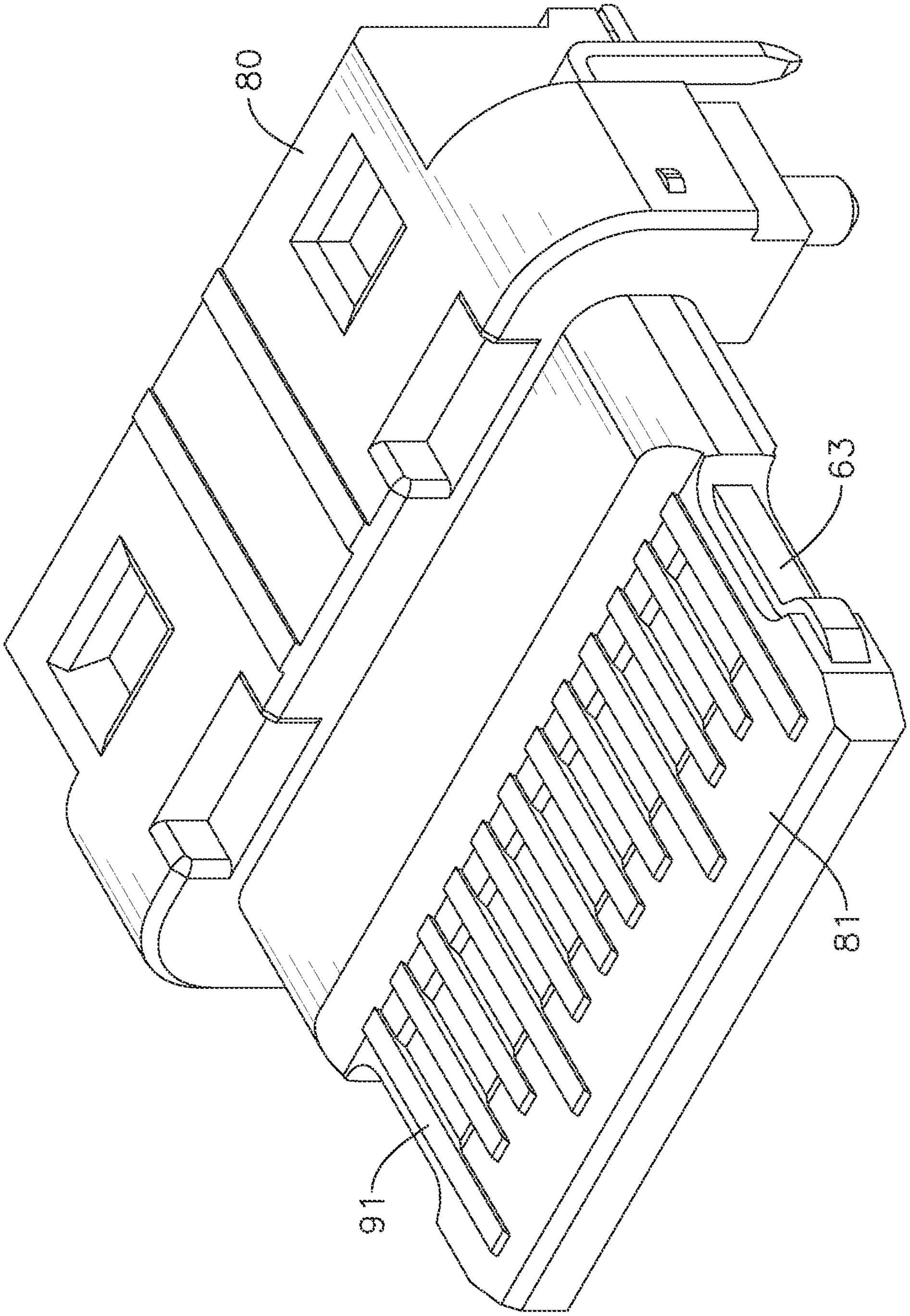
FIG. 10 PRIOR ART
FIG. 10 is another perspective view of the conventional electrical connector in FIG. 8, showing the metal mask being omitted.

In terms of the effectiveness of the present invention, as shown in FIGS. 6 and 7, the height of each of the side sub-walls 43 and the thickness of the distal portion 111 of the tongue 11 are the same, the outer side surface of each of the side sub-walls 43 is exposed outside the distal portion 111 of the tongue 11 to form one of the tongue sides 113, and the front surface of the front sub-wall 44 is exposed outside the distal portion 111 of the tongue 11 to form the tongue tip 114. The side sub-walls 43 and the front sub-wall 44 directly withstand impact when the electrical connector is plugged or unplugged, so as to improve structural strength of the tongue 11 multi-directionally. In particular, even though a plugging angle may be deviated or an excessive force may be applied when plugging the electrical connector, the tongue tip 114 formed by the front sub-wall 44 is not damaged due to its high structural strength. Moreover, with the front sub-wall 44 and the side sub-walls 45 forming the continuous protective wall, the structural strength of the tongue can be greatly improved multi-directionally.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An electrical connector comprising:
- a package provided with a tongue, and the tongue protruding from a front end surface of the package;
- an upper terminal set mounted in the package and including multiple upper terminals, and an end of each of the upper terminals partially exposed on an upper surface of the tongue;
- a lower terminal set mounted in the package and including multiple lower terminals, and an end of each of the lower terminals partially exposed on a lower surface of the tongue; and
- a median septum mounted in the package and the tongue and disposed between the upper terminal set and the lower terminal set, and the median septum having
  - a front edge;
  - two side edges; and
  - a protective wall formed onto the two side edges of the median septum and the front edge of the median septum and longitudinally extending up from an upper surface of the median septum and down from a lower surface of the median septum, so as to form two tongue sides and a tongue tip of the tongue.

2. The electrical connector as claimed in claim 1, wherein
- the tongue has a distal portion and a proximal portion, and
  - a thickness of the distal portion of the tongue is less than a thickness of the proximal portion of the tongue;
- the median septum having
  - a wide section; and
  - a narrow section disposed in the tongue; and,
- the protective wall includes
  - two side sub-walls formed onto the two side edges of the median septum respectively and longitudinally extending up from the upper surface of the median septum and down from the lower surface of the median septum such that the median septum and each of the side sub-walls is T-shaped in cross-section, wherein an outer side surface of each of the side sub-walls is exposed outside the distal portion of the tongue to form one of the tongue sides; and
  - a front sub-wall formed onto the front edge of the median septum and longitudinally extending up from the upper surface of the median septum and down from the lower surface of the median septum such that the median septum and the front sub-wall is T-shaped in cross-section, wherein a front surface of the front sub-wall is exposed outside the distal portion of the tongue to form the tongue tip.

3. The electrical connector as claimed in claim 2, wherein a height of each of the side sub-wall and the thickness of the distal portion of the tongue are the same.

4. The electrical connector as claimed in claim 2, wherein two opposite ends of the front sub-wall are connected with the side sub-walls through two connecting sub-walls respectively.

5. The electrical connector as claimed in claim 4, wherein
- a height of each of the side sub-wall is greater than a height of the front sub-wall; and
- each of the connecting sub-walls longitudinally extends up from the upper surface of the median septum and down from the lower surface of the median septum and has
  - a rear end connected with a corresponding one of the side sub-walls and having a height that is the same as the height of the corresponding side sub-wall; and
  - a front end connected with the front sub-wall and having a height that is the same as the height of the front sub-wall.

6. The electrical connector as claimed in claim 2, wherein the median septum further has two connection pins mounted on two opposite ends of the wide section and forming electrical connections, and an end of each of the connection pins protrudes out of the package.

7. The electrical connector as claimed in claim 2, wherein
- each of the upper terminals has
  - a horizontal segment disposed in the distal portion of the tongue and partially exposed on the upper surface of the tongue; and
  - a bent segment partially exposed outside the package; and
- each of the lower terminals has
  - a horizontal segment disposed in the proximal portion of the tongue and partially exposed on the lower surface of the tongue; and
  - a bent segment partially exposed outside the package.

8. The electrical connector as claimed in claim 1, wherein
- the upper terminal set further includes an upper block;
- the upper terminals are embedded on the upper block, and the upper terminals and the upper block are covered by the package;
- the lower terminal set further includes a lower block; and
- the lower terminals are embedded on the lower block, and the lower terminals and the lower block are covered by the package.

9. The electrical connector as claimed in claim 1, wherein the median septum is made by die casting.

10. The electrical connector as claimed in claim 2, wherein the median septum is made by die casting.

11. The electrical connector as claimed in claim 3, wherein the median septum is made by die casting.

12. The electrical connector as claimed in claim 4, wherein the median septum is made by die casting.

13. The electrical connector as claimed in claim 5, wherein the median septum is made by die casting.

14. The electrical connector as claimed in claim 1, wherein the median septum is made by metal injection modeling (MIM).

15. The electrical connector as claimed in claim 2, wherein the median septum is made by metal injection modeling (MIM).

16. The electrical connector as claimed in claim 3, wherein the median septum is made by metal injection modeling (MIM).

17. The electrical connector as claimed in claim 4, wherein the median septum is made by metal injection modeling (MIM).

18. The electrical connector as claimed in claim 5, wherein the median septum is made by metal injection modeling (MIM).

* * * * *